United States Patent [19]
Ford

[11] Patent Number: 6,058,806
[45] Date of Patent: May 9, 2000

[54] AUTOMATIC CHAIN SAW SHARPENER

[76] Inventor: Stuart N. Ford, 998 Manakin Rd., Manakin, Va. 23101

[21] Appl. No.: 09/135,604

[22] Filed: Aug. 18, 1998

Related U.S. Application Data

[60] Provisional application No. 60/057,470, Sep. 3, 1997.

[51] Int. Cl.[7] .................................................. B23D 63/16
[52] U.S. Cl. ............................................................ 76/80.5
[58] Field of Search .................................. 76/80.5, 37, 45

[56] References Cited

U.S. PATENT DOCUMENTS

| | | |
|---|---|---|
| 3,744,349 | 7/1973 | Juncker . |
| 4,062,253 | 12/1977 | Dilworth . |
| 4,102,223 | 7/1978 | Robinson et al. ........................ 76/80.5 |
| 4,104,793 | 8/1978 | Simington . |
| 4,319,502 | 3/1982 | Smith . |
| 4,463,499 | 8/1984 | Fritz . |
| 4,677,881 | 7/1987 | Jorde . |
| 5,107,726 | 4/1992 | Wilhite et al. . |
| 5,156,071 | 10/1992 | Stevens . |

*Primary Examiner*—Douglas D. Watts
*Attorney, Agent, or Firm*—Christopher H. Hunter

[57] ABSTRACT

An automatic chain saw sharpener includes a housing enclosing a sharpening device for sharpening a saw chain, an incrementing device assembly for incrementing the saw chain, and a timing device for operating the sharpening device until the entire saw chain has been sharpened automatically, without constant user intervention. The chain saw is supported by a bar guide and a pair of adjustable bar stabilizer clamps, and adjustment screws adjust the vertical height of a support plate supporting the sharpening device and the incrementing assembly. At initial operator set-up, a pair of friction wheels in the incrementing device are tightened down against the side surfaces of the saw chain links to increment the chain around the saw bar. After the operating cycle begins, a pair of contact sensors sense the presence and orientation of the cutting teeth along the chain. When a cutting tooth is sensed, the movement of the chain is stopped, and the sharpening device pivots to a correct sharpening orientation depending upon the angle of the tooth. The sharpening device then pivots into contact with the cutting surface of the tooth and is operated until an appropriate hone on the cutting edge of the tooth is obtained. The sharpening device is then pivoted away from the cutting tooth, and the chain is incremented until a contact sensor senses a subsequent cutting tooth, where the process is repeated. The timing device is connected to an indicator light to provide the user with a visual indication that the sharpening cycle is complete.

45 Claims, 4 Drawing Sheets

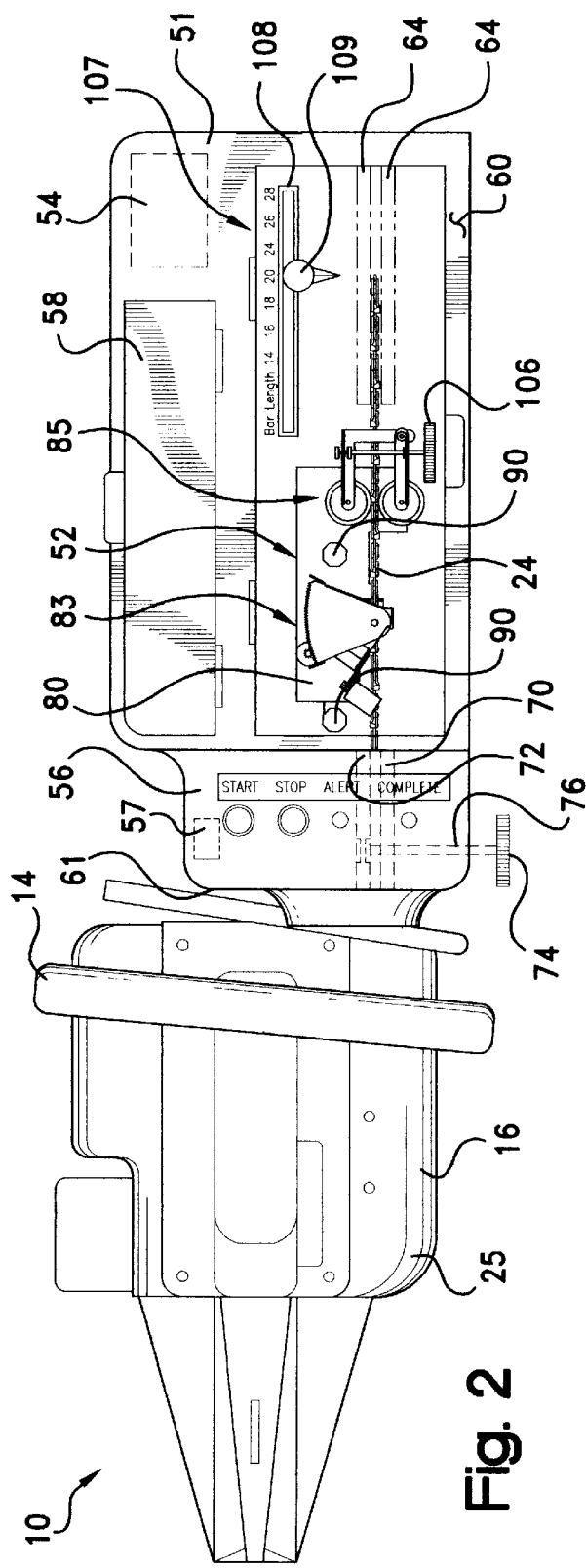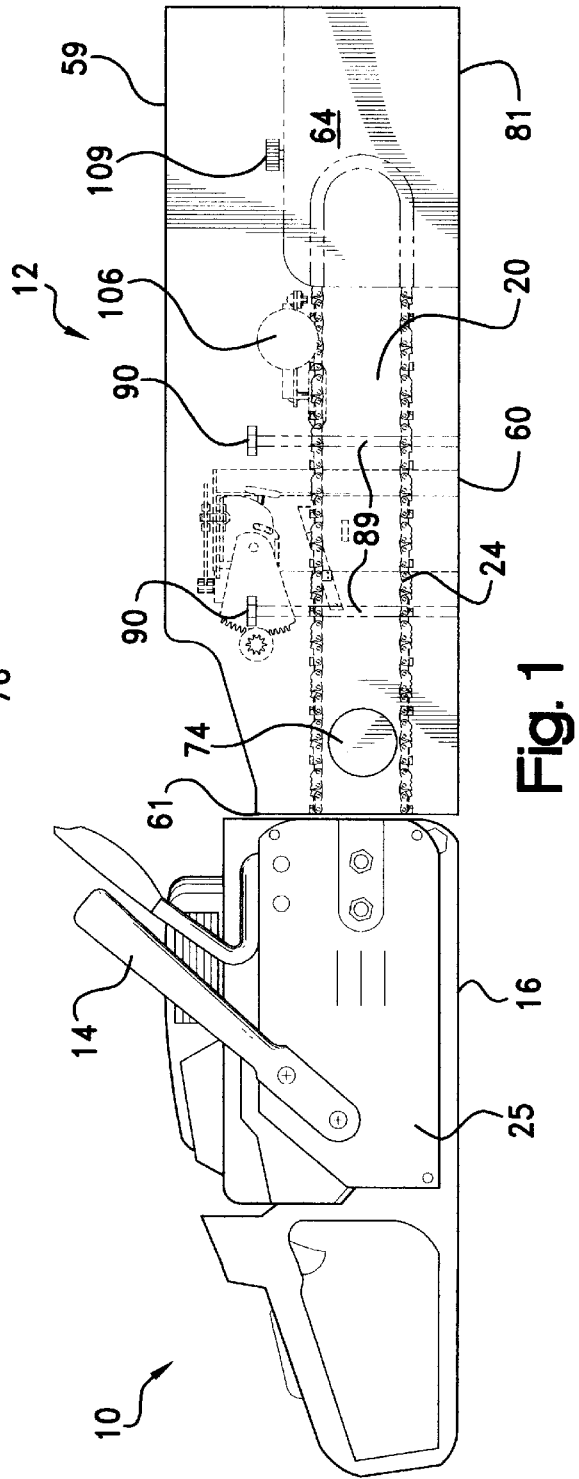

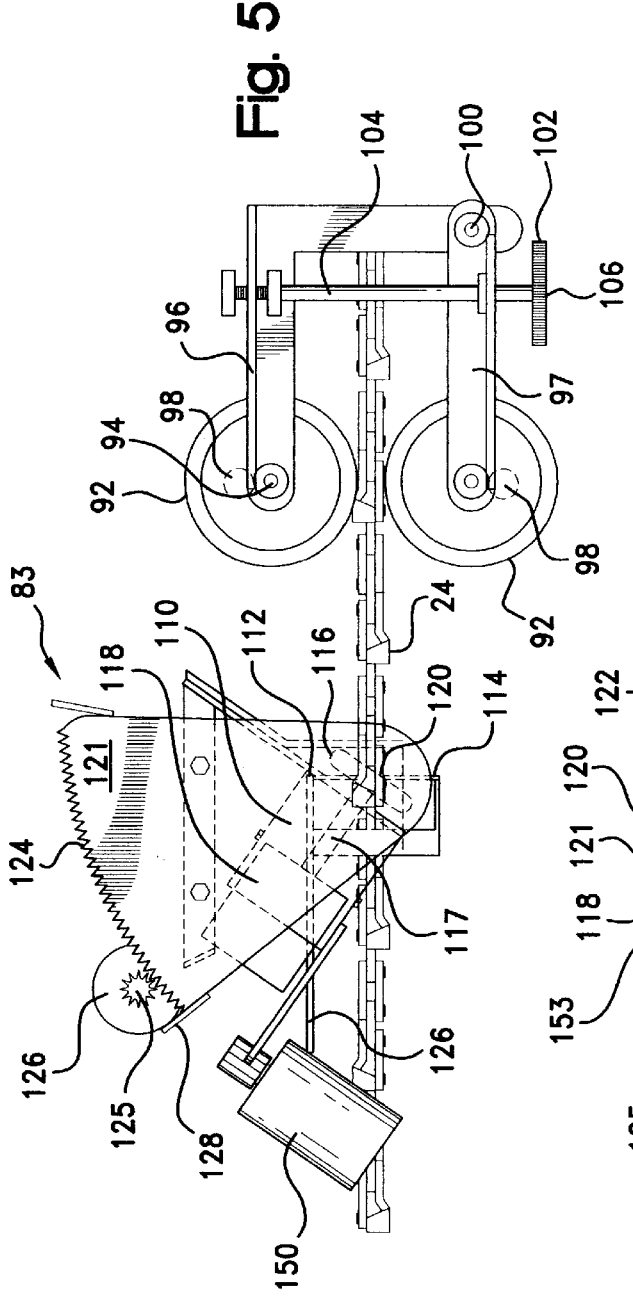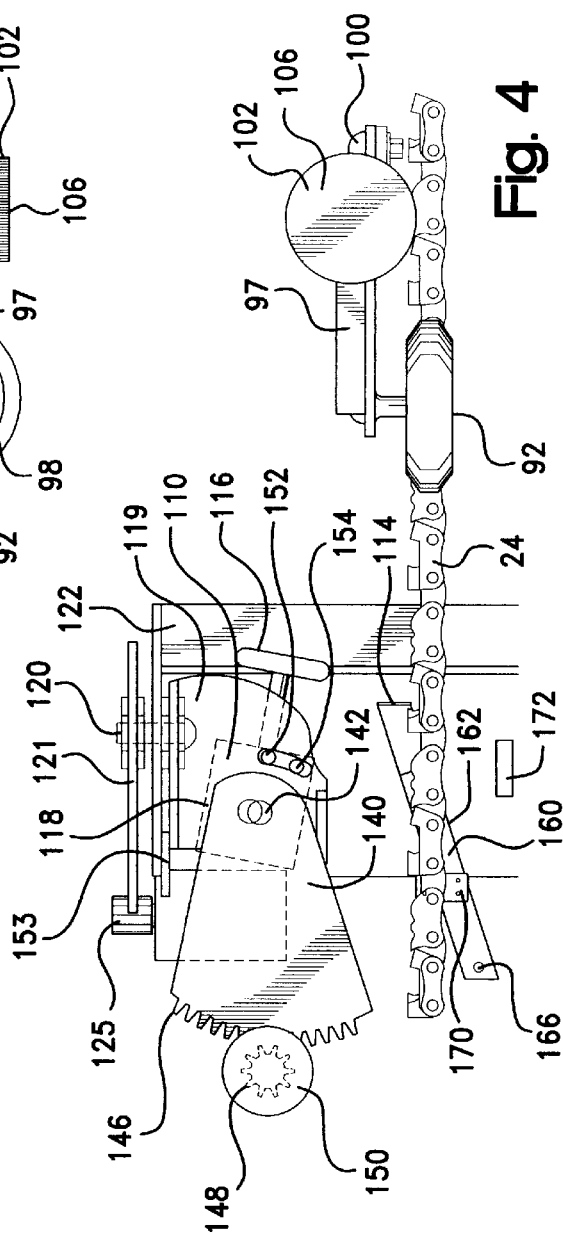

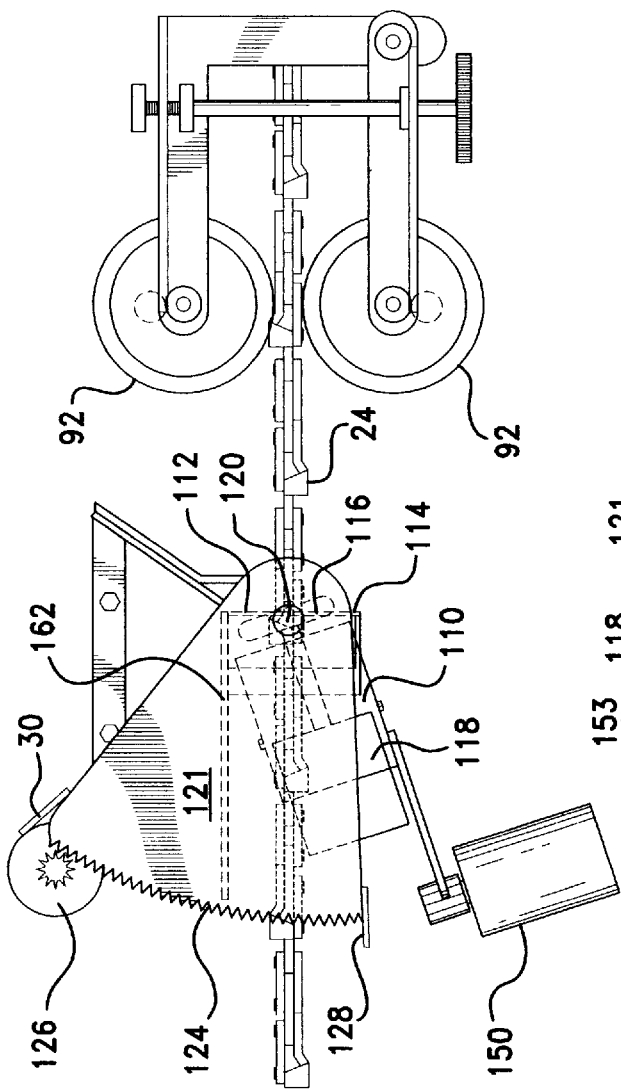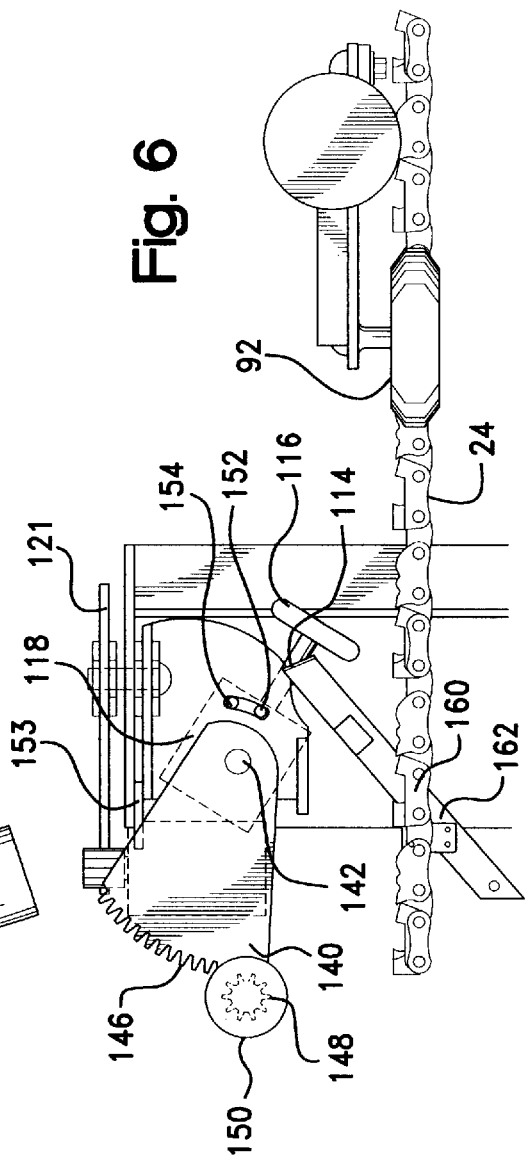

AUTOMATIC CHAIN SAW SHARPENER

RELATED CASES

The present application claims priority to U.S. Provisional Application Ser. No. 60/057,470; filed Sep. 3, 1997.

FIELD OF THE INVENTION

The present invention relates to a chain saw sharpener, and more particularly to a chain saw sharpener which automatically sharpens the cutting surfaces of the teeth around a saw chain.

BACKGROUND OF THE INVENTION

Chain saws are currently employed to fell trees and trim branches, and to reduce the trees and branches to logs of manageable size. Chain saws include an engine or motor enclosed within a housing, and a thin bar extending outwardly from the housing upon which an endless chain slides. Chain saws may be powered by gasoline or diesel engines or electric motors, and are employed in situations where the depth of cut is more than a few inches and a wide kerf is desirable or acceptable. Commercial applications generally require more heavy duty chain saws with longer and wider bars and correspondingly longer and wider chains, while consumer applications typically have shorter and thinner bars and chains.

Through use, the cutting surfaces of the various teeth along the chain become dulled and worn. This requires additional pressure on the chain saw to effect the desired cut, can generate excessive and dangerous heat, and generally makes it difficult to cut through the wood. It is thus necessary to periodically sharpen the cutting surfaces of the teeth to maintain efficiency in the cutting operation. The saw chain comprises a series of right-hand cutting links and left-hand cutting links, alternatively positioned around the chain. The cutting portion of each link includes a cutting tooth typically with a first surface perpendicular to the saw kerf and a second surface parallel to the saw kerf. The two cutting surfaces normally join at right angles in a chisel-bit-type cutter tooth, or a single curved surface may be used which extends into the two planes perpendicular and parallel to the saw kerf. An upstanding portion, typically referred to as a depth gauge, projects upwardly in front of the cutting surfaces on each link. The forward edge of the cutting surfaces are typically ground at a predetermined rake angle, typically 35 degrees, with respect to a line drawn perpendicular to the length of the cutting link. Detailed illustrations and descriptions of cutting links for conventional chain saws are found for example in U.S. Pat. Nos. 5,156,071 and 4,463,499.

The unique shape of the cutting teeth on a chain saw and their location on separate links in a chain requires special sharpening tools in order to accurately and quickly sharpen the blade.

Large scale commercial operations can sometimes afford extra chains which can replace worn chains, and/or expensive (and complex) sharpening machines and dedicated personnel to operate the machines. However, many operations, as well as typical consumers, are not so well organized and funded. One tool which has been used by these individuals is a round or triangular file which is manually drawn along the cutting surfaces of the teeth. The file is drawn back and forth until the proper hone of the surface is obtained. This can be a tedious and time-consuming process, and many consumers are not skilled in properly drawing the file back and forth to create a proper rake angle, and a rake angle which is the same for the right and left facing teeth.

A number of mechanical saw sharpeners have also been developed in an attempt to reduce the labor and improve the accuracy with which the saw chains are sharpened. One such sharpener is shown in U.S. Pat. No. 4,463,499, where a rotary burr formed of hardened steel and affixed to a hand crank can be manually rotated and brought into position within a cutting tooth to sharpen the tooth. Another sharpener is shown in U.S. Pat. No. 5,107,726 where a circular file is rotatably mounted within support members and can be manually brought into contact with the teeth and rotated until the proper hone is achieved.

Still another sharpener uses a rotating cylindrical stone sized so that the cylindrical surface forms the cutting edges on the chain saw tooth. Other sharpeners employ grindings wheels which are shaped to form the proper cutting surfaces. One such sharpener is shown in U.S. Pat. No. 5,156,071 where a sharpening tool with a flat circular plate is affixed with a circumferential abrasive bead having a convex profile. The convex profile of the bead fits into the space between the depth gauge and the cutting tooth of a chain saw blade and is mechanically rotated to form the cutting tooth.

In the above sharpeners, the chain saw bar is initially grasped and held stationary, and the sharpening tool is brought into contact with an appropriate cutting tooth. Because the cutting teeth alternate in angle, that is, a right-facing cutting tooth with a right-facing cutting surface alternates with a left-facing tooth with a left-facing cutting surface, the sharpening tool has to be manually aligned with the particular cutting surface to be sharpened. Some sharpeners successively sharpened all the right-facing cutting teeth with right-facing cutting surfaces, and then all the left-facing teeth with left-facing cutting surfaces. Other sharpeners allow the sharpening tool to be manually positioned in alternating right and left orientations for cutting each successive (right or left-facing) tooth.

While many chain saw sharpeners have been developed in an attempt to quickly and easily sharpen the cutting teeth along a chain saw, it is believed that heretofore these sharpeners have still required an unacceptable amount of user/operator time and effort, particularly in adjusting and positioning the sharpener correctly with respect to a cutting tooth, sharpening the tooth, and then incrementing the chain to the next tooth. It can be difficult for the user to determine when the proper hone of a tooth has been reached. It is also believed that because of the user involvement in the sharpening process, it can also be difficult to consistently and repeatably obtain a proper hone to the cutting surfaces, both in rake angle and from tooth-to-tooth.

Applicant further believes that heretofore automated chain saw sharpeners have not been developed mainly because of the problem of compensating for the length and width of the chain and the distance between cutting teeth, which can vary between manufacturer-to-manufacturer, and sometimes between model-to-model. The bevel and depth of each tooth can also vary in the same way. While manual sharpeners generally allow the user to determine the proper angle and depth of the cutting tooth, and when the sharpening process is complete (that is, when all the teeth have been sharpened), this appears to have discouraged the development of a more automated process, at least until the present invention.

Applicant therefore believes there is a demand in the industry for a more automated chain saw sharpener which allows the user to quickly and easily sharpen the entire chain on the saw, even if the user does not have expertise in chain saw sharpening. It is also believed there is a demand in the industry for a chain saw sharpener which easily accepts a wide variety of chain lengths, widths, bevels, depths, and tooth-to-tooth distances, so that the sharpener can be used in both commercial and consumer applications. Further, it is believed there is a demand in the industry for a chain saw sharpener which is relatively simple in construction and in operation, is portable, and is relatively inexpensive to purchase and maintain.

SUMMARY OF THE PRESENT INVENTION

The present invention provides a new and unique automatic chain saw sharpener which sharpens the teeth along the entire length of the chain without constant user intervention. The sharpener is relatively simple in operation, does not have complex operating mechanisms, and can easily and effectively sharpen saw chains of different lengths, widths, bevels, depths and tooth-to-tooth distances.

According to the present invention, the sharpener includes a housing which is supportable on a bench, flat bed of a truck, or at any other convenient location. The chain saw is inserted into an open end of the housing with the chain saw bar being received within a bar guide, and a simple one-time calibration or set-up procedure is performed. Bar stabilizer clamps are initially tightened down on opposite sides of the chain saw bar to stabilize the chain saw relative to the housing. A support plate carrying a sharpening device and incrementing device is then vertically adjusted using adjustment screws or other mechanisms until the links of the chain are at a proper height for the operating cycle. The incrementing device is then tightened down against the chain to increment the saw chain around the saw bar when appropriate.

The sharpening process includes incrementing the saw chain using the incrementing device until the first cutting tooth along the chain engages one of a pair of contact sensors, which are located on opposite sides of the chain. When a contact sensor senses a cutting tooth, the movement of the chain is stopped, and the sharpening device automatically pivots laterally to a correct sharpening orientation for the respective cutting surface. The sharpening device then pivots downwardly into contact with the cutting tooth and is operated until an appropriate hone on the cutting edge of the tooth is obtained. The sharpening device is then pivoted away from the cutting tooth, and the chain is incremented until a contact sensor senses a subsequent cutting tooth, where the process is repeated.

According to the preferred embodiment, the incrementing device preferably includes a pair of friction wheels rotatable by a motor. Each friction wheel has an contact surface which grips the saw chain as the wheel turns, and increments the saw chain around the saw bar. Also according to the preferred embodiment, the sharpening device is preferably a disk-shaped sharpening stone which is rotated by a motor. The sharpening stone is supported above the cutting tooth to be sharpened and pivoted into a proper sharpening orientation, depending upon the orientation of the cutting tooth determined by the contact sensor. The sharpening stone is then pivoted downwardly into contact with the cutting surface and simultaneously rotated for a period of time until the surface is properly honed. The sharpening stone is then pivoted upwardly away from the cutting blade and the rotation is stopped. The chain is then incremented forwardly until one of the contact sensors sensor senses a subsequent cutting tooth, where the process is repeated.

A timing device determines the length of the saw chain to be sharpened. The timing device can be an automated device, or can be initially manually set during the calibration/set-up procedure such as by moving a pointer to the forward end of the chain saw bar. The pointer can be spring-biased along a track and include a contact sensor which senses the return of the pointer to its initial position. In any case, the sharpening device repeats the sharpening process through the entire length of the chain until all the cutting teeth are successively sharpened.

At the end of the sharpening cycle, an indicator light can be activated to provide the user with a visual indication that the sharpening process is complete. The user can then easily remove the chain saw from the housing of the sharpener and proceed with the cutting operation.

As described above, the automatic chain saw sharpener of the present invention provides for simply and easily sharpening the cutting teeth on a chain saw. The sharpener sharpens an entire chain without constant user intervention, and by only requiring a simple calibration/set-up process. The sharpener does not include complex components, which minimizes the cost and reduces operating and maintenance costs, and effectively sharpens saw chains of different lengths, widths, bevels, depths, and tooth-to-tooth distances.

Further features of the present invention will become apparent to those skilled in the art upon reviewing the following specification and attached drawings.

BRIEF DESCRIPTION OF THE DRAWINGS

FIG. 1 is a side perspective view of a chain saw and a chain saw sharpener constructed according to the principles of the present invention;

FIG. 2 is a top view of the chain saw and chain saw sharpener of FIG. 1 with the upper cover removed;

FIG. 4 is an enlarged view of the sharpening apparatus of the sharpener of FIG. 1, illustrating the apparatus during initial calibration;

FIG. 5 is a top enlarged view of the sharpening apparatus of FIG. 4, illustrating the sharpening apparatus on one side of the chain;

FIG. 6 is an enlarged view similar to FIG. 4, but illustrating the sharpening apparatus during the sharpening process; and FIG. 7 is a side enlarged view of the sharpening apparatus of FIG. 6, illustrating the sharpening apparatus on the other side of the chain.

DETAILED DESCRIPTION OF THE PREFERRED EMBODIMENT

Figure 3:
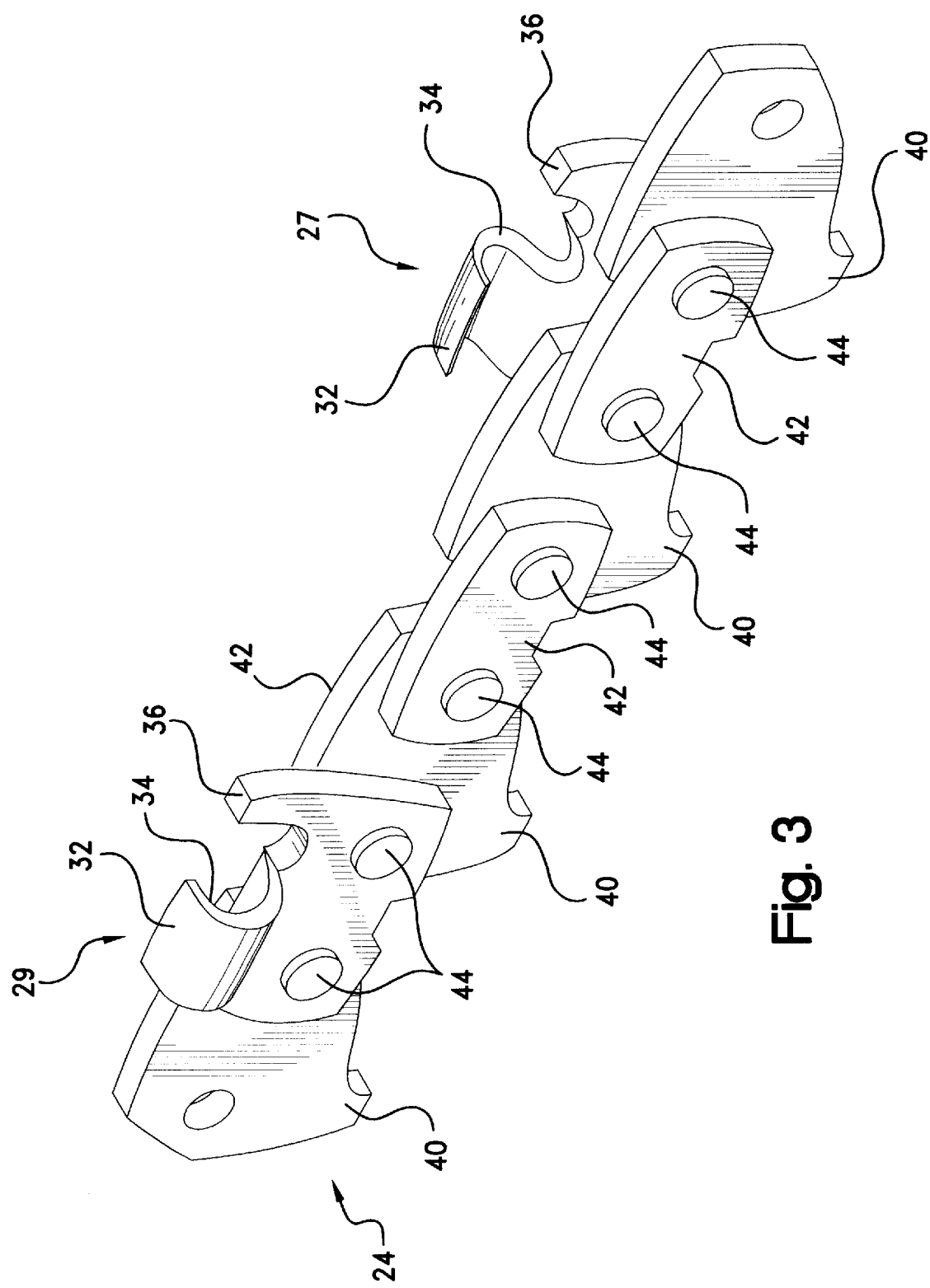
FIG. 3 is an illustration of a section of a commonly-used type of saw chain, shown remove from the bar for clarity.

Referring to the drawings, and initially to FIGS. 1 and 2, a chain saw to be sharpened is indicated generally at 10, which is shown located within a chain saw sharpener, indicated generally at 12, constructed according to the principles of the present invention. Chain saw 10 can be any available type of chain saw including an engine or motor 16, a handle 14 and a blade or bar 20. The bar 20 is a thin, elongated member which extends outwardly from the engine and serves as a guide for a cutting chain 24. The cutting chain is and endless loop which is entrained about a sprocket enclosed within a shroud 25 covering the engine. The sprocket is driven in a conventional fashion by the engine or motor to rotate the chain around the bar. The chain saw can be operated by a conventional gasoline or diesel powered combustion engine, by an electric motor, or by other means. The chain saw generally forms no part of the present invention.

As shown in FIG. 3, the chain for the chain saw comprises a series of right-hand cutting links 27 and left-hand cutting links 29, positioned alternatingly along the chain. Each cutting link is made up of two operative portions, specifically, a curved cutting portion 32 which defines a curved cutting edge 34, and an upstanding projection 36 at the forward end of the cutting edge which is usually referred to as a depth gauge. The cutting edges are ground at a predetermined rake angle, typically 35 degrees with respect to a line drawn perpendicular to the length of the cutting link, although this may vary for some manufacturers. When the chain saw is in use, the depth gauge 36 leads the cutting edge 34 into the wood and determines the depth of penetration of the cutting edge into the wood. The chain saw also includes drive links 40 which are engaged by the sprocket of the chain saw in order to propel the chain around the saw bar. The edge of the saw bar is ordinarily provided with a channel for receiving the lower portions of the drive links, thereby maintaining the saw chain in position along the periphery of the bar. The drive links 40 and cutting links 27, 29 are interconnected by tie straps 42 and rivets 44 to form a continuous chain which extends around the saw bar in an endless loop. The foregoing description of the saw chain is also conventional and forms no part of the present invention.

Referring again to FIGS. 1 and 2, the sharpener 12 includes a housing 50 enclosing a sharpening assembly, indicated generally at 52, a conventional AC or DC power supply 54, a keypad/visual indicator 56, and an accessory tray 58. The keypad area of housing 50 also includes appropriate electronics 57 (processors, etc.) to control the sharpener, as will be described herein in more detail. The housing preferably includes an upper removable cover 59 to allow visual inspection of the various components within the housing, and a lower base 60 which can include a stand (not shown) or can be a stand-alone component which can be easily supported on the flat bed of a truck, on a work bench, or on any other appropriate rigid surface. One end 61 of the housing includes a vertical slot or opening which is open to the upper edge of the housing and which is sized to accommodate the widest of common chain saw bars. When the cover is removed, the chain saw bar can be easily located within the housing, with the chain saw bar 20 extending lengthwise through the housing and out through the opening in end 61.

For initially setting up/calibrating the chain saw sharpener for a particular chain saw, the cover 59 is opened or removed and the front portion of the saw bar is inserted into and oriented within a bar guide 62. Bar guide 62 includes a pair of vertical guide walls 64 extending from the forward portion of the housing along a portion of the saw bar and which are evenly spaced from one another slightly wider than the width of the bar.

At the rear portion of the housing a pair of bar clamps, indicated generally at 68, are provided on opposite sides of the saw bar. The bar clamps include a pair of vertical guide walls 70, 72, of which wall 70 is supported adjacent the saw bar and is fixed to the housing, and wall 72 is horizontally moveable with respect to wall 70 by rotation of a gnarled wheel 74 attached to a threaded rod 76. Threaded rod 76 is rotatably supported in an opening in wall 70 and extends to a rotatable connection on opposite wall 72. Rotation of wheel 74 causes opposite wall 72 to move toward or away from wall 70. Rotation of the wheel to bring the walls 70 and 72 together on opposite sides of the bar securely supports and stabilizes the chain saw bar within the housing. Guide walls 70, 72 are of a size so as to locate approximately in the center of a chain saw bar regardless of bar width so as to not interfere with the rotation of the saw chain. It is noted that bar guide 62 and bar clamps 68 are only one way of stabilizing the chain saw, and others structures and techniques (including automatic techniques) are of course possible, although it is preferred that such process be relatively easy for the user and require only a minimum of moveable parts, and in any case hold the saw bar perfectly vertical such that the chain saw links are in perfect alignment to be treated, as will be discussed below.

It is noted that the above stabilizing operation is required during each chain saw sharpening, that is, for each chain saw to be sharpened. Once the saw bar is stabilized within the housing, the sharpening apparatus is adjusted for the particular chain saw type. The following adjustment procedure is generally only necessary the first time a particular chain saw is sharpened (but needs to be performed for each different chain saw model or type). The sharpening apparatus 52 generally includes an adjustable flat support plate 80 which extends parallel to the lower wall 81 of the housing, a sharpening assembly, indicated generally at 83, supported on the support plate 80, and an incrementing device, indicated generally at 85, which is also supported on support plate 80. Support plate 80 is vertically adjustable using one or more adjustment screws, two of which for example are indicated at 87. Each adjustment screw preferably includes a threaded rod 89 extending through a threaded bore in the support plate to a rotatable connection with the lower wall of the housing, and which by rotation of a gnarled head 90 on each of the threaded rods, allows the support plate to be raised and lowered substantially parallel to the lower wall of the housing. The number of adjustment screws can vary as necessary to easily yet properly move the base. The support plate is vertically adjusted until the incrementing device 85 is aligned with the chain 24 on the saw bar 20, as will be described more fully below. Other structures and techniques could of course be used to raise or lower the support plate (including automatic techniques), although again it is preferred that such process be relatively easy for the user and require only a minimum of moveable parts.

Referring now to FIGS. 4 and 5, the incrementing device 85 preferably includes a pair of disk-shaped friction wheels 92 which are rotatably mounted on either side of the saw bar 20 at the same vertical height, and which rotate around axes substantially parallel to the side surfaces of the saw bar. The friction wheels preferably have an elastomeric or resilient peripheral surface, which aids in gripping the saw chain. The wheels are rotatably supported on rods 94, which extend upwardly (or downwardly) to a fixed connection on a pair of support arms 96, 97. The friction wheels are each rotated in opposite directions by a motor 98 (or motors) which can be an AC or DC motor electrically connected to the power supply 54 and also controlled by the processor 57. Support arms 96, 97 are pivotally connected to pin 100, which extends downwardly to a fixed connection with support plate 80. An adjustment screw 102 has a rod 104 which is rotatably supported in a hole in side wall of the straight support arm 97 and has a threaded end which extends through a hole in the sidewall of the L-shaped support arm 96. Rotation of gnarled head 106 of adjustment screw 102 causes support arms 96, 97 to move horizontally toward and away from each other, which thereby causes wheels 92 to move horizontally toward and away from the chain saw bar.

Through adjustment of the vertical adjustment screws 90, the friction wheels 92 can be vertically adjusted such the radially outer (peripheral) surface of the wheels are in vertical alignment with the saw chain links (see, e.g., FIG. 4), and preferably with the portion of the saw chain extending around the upper portion of the saw bar, although they could also be brought into alignment with the portion of the saw chain extending around the lower portion of the saw bar if desired. The horizontal adjustment screw 102 is then rotated to bring the friction wheels 92 into engagement with the sides of the saw chain. Rotation of the friction wheels 92 (in opposite directions to each other) thereby increments the saw chain in a desired direction, which is preferably in a forward direction for the saw chain links on the upper portion of the saw bar away from the motor and around to the lower portion of the saw bar. The resilient coating on the friction wheels generally prevents the wheels from slipping on oily or dirty chains, provided the adjustment wheel 102 is properly tightened.

The final step in the adjustment process is to identify the length of the chain so that the sharpening assembly will sharpen all the cutting teeth on the chain. The length of the chain can be determined by setting a manual pointer, such as indicated at 107, which can be moved along a track 108 until the pointer head 109 is aligned with the forward end of the saw bar. The pointer can be spring-biased, which moves the pointer back into its original position during some known time interval. A contact sensor can be located along the track to sense the return of the pointer to its initial position, and provide the information to processor 57. During operation of the sharpening device (as will be described below), the timing device can be set such that the timing device will terminate the sharpening process after all of the cutting teeth on the chain have been sharpened. A light on keypad 56 can also be caused to activate when the pointer returns to its initial position, indicating to the user that the sharpening process is complete. In this way, at least a rough estimate as to the length of the chain around the chain saw can be determined, as the length of the saw bar necessarily determines the length of the chain. Other timing devices (such as automatic timing devices) can of course be used, although it is believed that the above device provides satisfactory results using simple components which are easy to use.

After the adjustment process described above is complete, the cover 59 to the sharpener housing 50 can be closed and the sharpening process can be initiated.

The sharpening assembly 83 for the chain saw sharpener includes a sharpening device 110 for sharpening the cutting teeth on the chain, and a pair of contact sensors 112, 114, disposed on opposite sides of the saw bar for sensing a cutting tooth on the chain and determining the proper orientation of the sharpening device. The sharpening device 110 preferably includes a sharpening stone 116 which is supported on a rod 117 rotatably connected to a motor 118. Motor 118 can be an high torque, single direction AC or DC motor electrically connected to the power supply 54 and controlled by the processor 57.

The sharpening stone 116 is preferably a disk-shaped, abradant stone, with rod 117 fixedly connected to the geometric axis of the stone. Although the stone could also be cylindrical or have other well-known shapes. The stone could also be metal, or could have diamond teeth. It is also noted that this is only one example of a device suitable for sharpening the cutting teeth of the saw chain. Other types of devices could also be used to properly hone the cutting edges of the teeth as should be known by those skilled in the art, for example diamond dust could be sprayed in a fine stream against the cutting edges. As such, the above is intended to be only an example of one type of sharpening device useful with the preset invention.

In any case, the sharpening device 110 is pivotally mounted on a side support plate 119, which supports the sharpening device above the saw bar. The side support plate 119 is fixed through pin 120 to an upper support plate 121. Pin 120 is supported by a bracket 122 extending downwardly to a fixed connection on support plate 80, such that plate 121 is supported parallel to support plate 80, while plate 119 is supported perpendicular to support plate 80. Upper support plate 121 is a wedge-shaped plate, with the outer arcuate edge having teeth, as shown at 124, which engage corresponding teeth on the gear 125 of a motor 126. Motor 126 is mounted to support plate 80 and is also a low torque reversible AC or DC motor electrically connected to the power supply 54 and controlled by the processor 57. The clockwise or counterclockwise rotation of the gear 125 pivots the upper support plate 121 through an arc, which pivots side support plate 119 and thereby moves the sharpening device 110 laterally above the saw bar through the same arc. The dimensions and movement of the upper support plate 121 are chosen such that the sharpening device moves from one proper orientation on one side of the saw bar (e.g., FIG. 5), to a second orientation on the other side of the support bar (e.g., FIG. 7). The orientations are typically ±35 degrees on either side of the saw bar for proper orientation with the bevel of the cutting teeth. Appropriate limit stops 128, 130 which include the combination of a stop surface and a contact sensor or switch electrically connected to power supply 54 and in communication with processor 57, are mounted to support plate 80 and are provided along the path of the support plate to control the pivotal movement of the sharpening device from one side of the saw bar to the other. Contact of the edges of upper support plate 121 with a respective limit stop interrupts the operation of the motor 126, which stops the pivotal movement of the support plate. Other types of limit stops could also be used which would allow the user to input appropriate bevel information into keypad 56, with the support plate 121 pivoting appropriately until the sharpening device is correctly oriented to the specific bevel angle. As should be understood from the above, the limit stops are mounted such that the sharpening device pivots to a proper lateral position on either side of the saw bar where the sharpening device is correctly oriented for either a left-facing or right-facing cutting tooth.

The vertical movement of the sharpening device is provided by a second vertical pivot plate 140, which is mounted to the side of support plate 119 and fixedly connected to the motor 118 by pin 142. Pin 142 extends through and is supported within an opening formed in plate 119. The arcuate edge of pivot plate 140 includes a series of teeth 146, which are engaged by corresponding teeth on a gear 148 of motor 150. Motor 150 is also mounted to support plate 80 and can also be a low torque reversible AC or DC motor electrically connected to the power supply 54 and controlled by the processor 57. Operation of motor 150 causes plate 140 to pivot about pin 142, which thereby causes motor 118 (and cutting stone 116) to likewise pivot vertically upward (FIG. 4) or downward (FIG. 6). The pivotal movement of motor 118 and stone 116 can be controlled by a limit stop comprising a pin 152 affixed to motor 118 and slideable within arcuate slot 154 in side plate 119, and a contact sensor 153 mounted to bracket 122 and electrically connected to the power supply 54 and in communication with processor 57. When plate 140 contacts contact sensor 153 (which is typically set so that the sharpening stone pivots downwardly to a 30 degree angle with respect to the horizontal), motor 150 can be deactivated for a period of time to allow the sharpening of the cutting tooth to take place (as will be described more fully below), and then reversed to pivot the motor 118, and hence stone 116, out of contact with the cutting tooth. Other types of limit stops could again be used which would allow the user to input appropriate depth information into keypad 56, with the pivot plate 140 pivoting until the sharpening device is correctly oriented to the specific depth. As should be understood from the above, the sharpening device 110 is thereby brought into a proper vertical orientation with the cutting teeth by the interaction of pin 152 in slot 154 and through contact sensor 153.

In order to properly position the sharpening device 110 relative to a particular cutting tooth to be sharpened, sensors 112, 114 are used to determine when a right-hand cutting tooth or a left-hand cutting tooth is present. Sensors 112, 114 can be conventional contact sensors electrically connected to the power supply 54 and in communication with processor 57. Sensors 112, 114 extend outwardly across the saw chain on the saw bar and provide a signal to processor 57 when a cutting tooth is sensed. The processor uses this information to i) activate motor 126 in an appropriate direction to pivot the sharpening device 110 into correct alignment with the sensed cutting tooth, ii) activate motor 118 such that sharpening stone 116 rotates at a high rate of speed, and iii) activate motor 148 such that the motor 118 is pivoted downwardly into contact with the cutting tooth. The sharpening device is positioned such that the sharpening stone pivots downwardly into contact with a cutting tooth at the location of the sensors. Alternatively, the point that the sharpening stone contacts the cutting tooth can be spaced from the sensors as long as the distance between the sensor and the contact point is calculated to properly position the sharpening stone with respect to the particular cutting surface on the cutting tooth.

If the sharpening device is set to contact the cutting tooth at the location of the sensors, the sensors are moved out of the way to avoid interfering with the sharpening stone. This can be accomplished in a number of ways, and preferably the sensors are mounted on a moveable boom 160, which pivots the sensors upwardly and away from the saw chain after the saw chain is stopped and while the motor 118 is being pivoted downwardly to sharpen a tooth. Boom 160, as shown in FIG. 4, includes a support arm 162 on one side of the saw bar, which supports the contact sensors 112, 114 and pivots on a pin 166. One device for pivoting the boom is a magnetic switch 170 which can be electrically connected to the power supply 54 and controlled by the processor 57. When activated, the magnetic switch causes boom 160 (and hence sensors 112, 114) to move upwardly out of engagement with the saw chain, and when deactivated, allows the boom (and sensors 112, 114) to fall by gravity into contact with the saw chain. A position stop 172 can be fixed to support plate 80 to provide downward support for the boom 160. Other types of devices to pivot the sensors out of contact with the saw chain could of course be used. Again, sensors 112, 114 are only one technique for determining the location of a cutting tooth such that the sharpening device can be properly aligned depending upon the location and bevel of the tooth. Other techniques could of course also be used.

While the operation of the sharpening device should be apparent from the above description, it will now also be briefly described. After calibration, a power-on button on the control pad 56 is pushed, and the motor 98 of the incrementing device 85 is activated, thereby moving the saw chain 24 forwardly around the saw bar 20 until a sensor 112 or 114 identifies the presence of a cutting tooth (FIG. 4). The incrementing device is then deactivated and the saw chain is brought to a stop. Depending upon which sensor is activated, the motor 126 will pivot the sharpening assembly 83 in one direction or the other (FIG. 5 or 7) to properly orient the sharpening stone 116 with the right or left-hand angle of the cutting tooth to be sharpened. Simultaneously, motor 118 on the sharpening device 110 is activated, which rotates stone 166 at a high rate of speed. Motor 150 is then activated, which pivots sharpening stone 116 into engagement with the cutting tooth at the correct bevel angle of the tooth (FIG. 6). The stone is pivoted downwardly into contact with the tooth with pin 152 sliding in slot 154 until plate 140 contacts sensor 153. After a predetermined length of time (during which the sharpening stone 116 hones the cutting edge), motor 150 is reversed, which pivots the stone upwardly out of engagement with the cutting tooth (FIG. 4). Motor 118 is also deactivated which stops rotation of the sharpening stone. Processor 57 controls the operation of the motors based upon signal information from the various sensors, which should be well apparent to those of ordinary skill in the art.

After the sharpening device is pivoted out of engagement with the saw chain, motor 98 is again activated to increment the chain until the next cutting tooth contacts a sensor, at which time the above process is repeated. The sharpening process is repeated until the timing device 107 provides a signal to the processor that all the cutting teeth on the saw chain have been sharpened, which thereby signals the operator via a light on the keypad, and stops the incrementing of saw chain 24. It is noted that the sharpener is not dependent upon the number of cutting teeth on the saw chain, on the spacing between the teeth, nor on the orientation (bevel, depth, width, etc.) of the teeth. The sharpener automatically adjusts for any characteristic of the chain and sharpens all the teeth on the chain without constant user intervention.

After the sharpening cycle is complete, the chain saw can be easily removed from the housing by reversing the above stabilization steps. That is, the cover 59 to the housing 50 is opened, the horizontal adjustment screw 102 is untightened to move friction wheels 92 away from the saw chain and the bar stabilizer clamps 74 are untightened to move the stabilizer plates 70, 72 away from the sides of the saw bar. If different types of chain saws are to be sharpened (different brands, models, etc.), then the vertical adjustment screws 90 are also untightened to move the support plate 80 (and associated components) downwardly away from the saw chain to allow the sharpener to be calibrated for the subsequent chain saw. The chain saw is then easily removed from the housing 50.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A sharpener for sharpening the chain of a chain saw, where the chain is entrained in an endless loop around a longitudinally-extending saw bar and includes a plurality of cutting links with left-facing and right-facing cutting surfaces, said sharpener comprising:

a housing base;

a bar stabilizer supported by said base, said bar stabilizer having a clamping mechanism which can receive and fixedly support the chain saw bar, the chain saw when supported having a portion of the chain at a selected vertical orientation with respect to the base;

a pair of friction wheels supported by the base and disposed for receiving said saw chain and grasping said saw chain on opposite sides of the saw bar at the selected orientation, each of said friction wheels being rotatable about an axis parallel to the supported chain saw bar to increment the chain in a direction around the saw bar;

a sensor device supported by the base which can sense the presence of successive cutting links as the saw chain is incremented, and communicate to the friction wheels to stop the incrementing of the chain such that a respective link is supported at a selected location;

a sharpening device supported by the base and which can be moved into and out of contact with the successive cutting links on the saw chain, said sharpening device having a sharpening tool which when the sharpening device is brought into contact with the saw chain, the tool contacts the respective cutting link at the selected location and when activated, sharpens the cutting surface of the respective cutting link; and a timing device selectively adjustable to operate the friction wheels and sharpening device through a full rotation of the saw chain until all cutting links on the saw chain have been sharpened.

2. The sharpener as in claim 1, further including a support plate supported by said housing base and vertically adjustable with respect to the housing base, said friction wheels and said sharpening device being mounted to said plate and adjustable into vertical alignment with the portion of the saw chain when the plate is vertically adjusted.

3. The sharpener as in claim 2, wherein said support plate includes an adjustment mechanism which can be manually manipulated to adjust the vertical orientation of the plate with respect to the base.

4. The sharpener as in claim 3, wherein said adjustment mechanism includes at least one threaded screw extending through the support plate and connected to the housing base, and an adjustment head on the screw which allows the plate to be manually vertically adjusted when the head is rotated.

5. The sharpener as in claim 2, wherein said sensor device is also mounted to said support plate and brought into vertical alignment with the portion of the saw chain when the plate is vertically adjusted.

6. The sharpener as in claim 1, wherein said bar stabilizer includes a pair of parallel plates set apart from one another and extending substantially perpendicular to said housing base which allow the saw bar to be located therebetween, and an adjustment mechanism which allows one of said plates to be adjusted toward the other to clamp the saw bar between the two plates and support the saw bar in a selected vertical orientation.

7. The sharpener as in claim 6, wherein said adjustment mechanism for the bar stabilizer includes at least one threaded screw extending through one of the plates and connected to the other plate, and an adjustment head on the screw which allows the one plate to be adjusted toward the other plate when the head is rotated.

8. The sharpener as in claim 1, wherein the sharpening device is laterally moveable with respect to the base from one side of the saw chain to the other such that the sharpening tool of said sharpening device can be properly oriented with respect to the cutting surface of the respective cutting link, said sensor device sensing the relative orientation of the cutting surface of the respective cutting link and communicating with the sharpening device such that the sharpening tool can be moved into the proper orientation with respect to the surface of the link to sharpen the link.

9. The sharpener as in claim 8, wherein said sharpening tool is pivotal about a first axis extending perpendicular to said base such that the tool is moved from one orientation where the tool can sharpen a cutting link with a left-facing cutting surface to another orientation where tool can sharpen a cutting link with a right-facing cutting surface.

10. The sharpener as in claim 9, wherein said sharpening tool is mounted to a first pivot plate, and a first motor device can pivot the first plate around said first pivot axis, said motor device being in communication with said sensor and activated when said sensor senses the presence of a cutting link to pivot the sharpening tool to the proper orientation.

11. The sharpener as in claim 8, wherein said sharpening device is vertically moveable toward and away from the chain saw such that the sharpening tool of said sharpening device can be brought into and out of contact with the cutting surface of the respective cutting link, said sensor device sensing the presence of a respective cutting surface of the respective cutting link and communicating with the sharpening device the presence of the cutting link such that the sharpening tool can be moved into contact with respect to the surface of the link to sharpen the link.

12. The sharpener as in claim 11, wherein said sharpening tool is pivotal about a second axis extending parallel to said base such that said tool is moved toward and away from the cutting links.

13. The sharpener as in claim 12, wherein said sharpening tool is mounted to a second pivot plate, and a second motor device can pivot the second plate around said second pivot axis, said second motor device also being in communication with said sensor and activated when said sensor senses the presence of the respective cutting link to pivot the sharpening tool into contact with the cutting surface of the respective cutting link.

14. The sharpener as in claim 8, wherein said sensor device comprises a pair of sensors, with a first of said sensors located to sense the presence of a right-facing cutting surface of a cutting link, and a second of said sensors located to sense the presence of a left-facing cutting surface of a cutting link.

15. The sharpener as in claim 14, wherein said sensor device is mounted to a pivoting mechanism to allow the sensor device to be moveable into and out of a contact position with the saw chain so as to prevent the sensor device from interrupting the movement of the sharpening device.

16. The sharpener as in claim 1, further including a processor for communicating with and controlling the activation of the friction wheels, sensor device, sharpening device and timing device.

17. A sharpener for sharpening the chain of a chain saw, where the chain is entrained in an endless loop around a longitudinally-extending saw bar and includes a plurality of cutting links with left-facing and right-facing cutting surfaces, said sharpener comprising:

a housing base;

stabilizer means supported by said base for receiving and fixedly supporting the chain saw bar, the chain saw bar when supported having a portion of the chain at a selected vertical orientation with respect to the base;

incrementing means for grasping the saw chain and incrementing the saw chain;

sensing means for sensing the presence of successive cutting links as the saw chain is incremented, and communicating to the incrementing means to stop the incrementing of the chain such that a respective link is supported at a selected location;

sharpening means moveable into and out of contact with the successive cutting links on the saw chain for sharpening the cutting surfaces on the links, said sharpening means having a sharpening tool which when the sharpening means is brought into contact with the saw chain, the tool contacts the respective cutting link at the selected location and when activated, sharpens the cutting surface of the respective cutting link; and timing means selectively adjustable to operate the incrementing device and sharpening device through a full rotation of the saw chain until all cutting links on the saw chain have been sharpened.

18. The sharpener as in claim 17, further including first pivot means for laterally moving the sharpening means across the housing base from one side of the saw chain to the other such that the sharpening tool of said sharpening means can be properly oriented with respect to the cutting surface of the respective cutting link, said sensor means sensing the relative orientation of the cutting surface of the respective cutting link and communicating with the sharpening means the relative surface orientation of the link such that the sharpening tool can be moved into the proper orientation with respect to the surface of the link to sharpen the link.

19. The sharpener as in claim 18, further including second pivot means for vertically moving said sharpening device toward and away from the chain saw such that the sharpening tool of said sharpening means can be brought into and out of contact with the cutting surface of the respective cutting link, said sensor means sensing the presence of the cutting surface of the respective cutting link and communicating with the sharpening means the presence of the cutting link such that the sharpening tool can be moved into contact with respect to the surface of the link to sharpen the link.

20. A sharpener for sharpening the chain of a chain saw, where the chain is entrained in an endless loop around a longitudinally-extending saw bar and includes a plurality of cutting links with left-facing and right-facing cutting surfaces, said sharpener comprising:

a housing base;

a bar stabilizer supported by said base, said bar stabilizer having a clamping mechanism for receiving and fixedly supporting the chain saw bar, the chain saw bar when supported having a portion of the chain at a selected vertical orientation with respect to the base;

an incrementing device disposed for receiving the saw bar when supported and having at least one surface which contacts the portion of the saw chain and increments the saw chain;

a sensor device for sensing the presence of successive cutting links as the saw chain is incremented, and communicating to the incrementing device to stop the incrementing of the chain such that a respective link is supported at a selected location;

a sharpening device moveable into and out of contact with the successive cutting links on the saw chain, said sharpening device having a sharpening tool which when the sharpening device is brought into contact with the saw chain, the tool contacts the respective cutting link at the selected location and when activated, sharpens the cutting surface of the respective cutting link; and a timing device selectively adjustable to operate the incrementing device and sharpening device through a full rotation of the saw chain until all cutting links on the saw chain have been sharpened.

21. The sharpener as in claim 20, further including a support plate supported by said housing base and vertically adjustable with respect to the housing base, said incrementing device and said sharpening device being mounted to said plate and adjustable into vertical alignment with the portion of the saw chain when the plate is vertically adjusted.

22. The sharpener as in claim 21, wherein said support plate includes an adjustment mechanism which can be manually manipulated to adjust the vertical orientation of the plate with respect to the base.

23. The sharpener as in claim 22, wherein said adjustment mechanism includes at least one threaded screw extending through the support plate and connected to the housing base, and an adjustment head on the screw which allows the plate to be manually vertically adjusted when the head is rotated.

24. The sharpener as in claim 21, wherein said sensor device is also mounted to said support plate and brought into vertical alignment with the portion of the saw chain when the plate is vertically adjusted.

25. The sharpener as in claim 20, wherein said bar stabilizer includes a pair of parallel plates set apart from one another and extending substantially perpendicular to said housing base which allow the saw bar to be located therebetween, and an adjustment mechanism which allows one of said plates to be adjusted toward the other to clamp the saw bar between the two plates and support the saw bar in a selected vertical orientation.

26. The sharpener as in claim 25, wherein said adjustment mechanism for the bar stabilizer includes at least one threaded screw extending through one of the plates and connected to the other plate, and an adjustment head on the screw which allows the one plate to be adjusted toward the other plate when the head is rotated.

27. The sharpener as in claim 20, wherein the sharpening device is laterally moveable with respect to the base from one side of the saw chain to the other such that the sharpening tool of said sharpening device can be properly oriented with respect to the cutting surface of the respective cutting link, said sensor device sensing the relative orientation of the cutting surface of the respective cutting link and communicating with the sharpening device such that the sharpening tool can be moved into the proper orientation with respect to the surface of the link to sharpen the link.

28. The sharpener as in claim 27, wherein said sharpening tool is pivotal about a first axis extending perpendicular to said base such that the tool is moved from one orientation where the tool can sharpen a cutting link with a left-facing cutting surface to another orientation where tool can sharpen a cutting link with a right-facing cutting surface.

29. The sharpener as in claim 28, wherein said sharpening tool is mounted to a first pivot plate, and a first motor device can pivot the first plate around said first pivot axis, said motor device being in communication with said sensor and activated when said sensor senses the presence of a cutting link to pivot the sharpening tool to the proper orientation.

30. The sharpener as in claim 27, wherein said sharpening device is vertically moveable toward and away from the chain saw such that the sharpening tool of said sharpening device can be brought into and out of contact with respect to the cutting surface of the respective cutting link, said sensor device sensing the presence of the cutting surface of the respective cutting link and communicating with the sharpening device the presence of the cutting link such that the sharpening tool can be moved into contact with respect to the surface of the link to sharpen the link.

31. The sharpener as in claim 30, wherein said sharpening tool is pivotal about a second axis extending parallel to said base such that said tool is moved toward and away from the cutting links.

32. The sharpener as in claim 31, wherein said sharpening tool is mounted to a second pivot plate, and a second motor device can pivot the second plate around said second pivot axis, said second motor device also being in communication with said sensor and activated when said sensor senses the presence of the respective cutting link to pivot the sharpening tool into contact with the cutting surface of the respective cutting link.

33. The sharpener as in claim 27, wherein said sensor device comprises a pair of sensors, with a first of said sensors located to sense the presence of a right-facing cutting surface of a cutting link, and a second of said sensors located to sense the presence of a left-facing cutting surface of a cutting link.

34. The sharpener as in claim 33, wherein said sensor device is mounted to a pivoting mechanism to allow the sensor device to be moveable into and out of a contact position with the saw chain so as to prevent the sensor device from interrupting the movement of the sharpening device.

35. The sharpener as in claim 20, further including a processor for communicating with and controlling the activation of the incrementing device, sensor device, sharpening device and timing device.

36. A sharpener for sharpening the chain of a chain saw, where the chain includes a plurality of cutting links with left-facing and right-facing cutting surfaces, said sharpener comprising:
   a sensor device for sensing the presence and orientation of successive cutting links on the chain;
   a sharpening device moveable into and out of contact with the successive cutting links on the saw chain, said sensor device communicating to the sharpening device the presence and orientation of a respective cutting link at a selected location, and said sharpening device having a sharpening tool which when the sharpening device is brought into contact with the saw chain, the tool contacts the respective cutting link at the selected location and at the proper orientation of the cutting surface and when activated, sharpens the cutting surface of the respective cutting link; and
   a timing device to operate the sharpening device until all cutting links on the saw chain have been sharpened.

37. The sharpener as in claim 36, wherein the sharpening device is moveable such that the sharpening tool of said sharpening device can be properly oriented with respect to the cutting surface of the respective cutting link, said sensor device sensing the relative orientation of the cutting surface of the respective cutting link and communicating with the sharpening device such that the sharpening tool can be moved into the proper orientation with respect to the surface of the link to sharpen the link.

38. The sharpener as in claim 37, wherein said sharpening device is laterally and vertically moveable from side-to-side and toward and away from the saw chain such that the sharpening tool of said sharpening device can be brought into and out of contact with respect to the cutting surface of the respective cutting link, said sensor device sensing the presence of the cutting surface of the respective cutting link and communicating with the sharpening device the presence of the cutting link such that the sharpening tool can be moved into contact with the respective link at a selected location to sharpen the link.

39. The sharpener as in claim 38, further including a stabilizing device for stabilizing the saw chain such that the respective cutting link is supported at the selected orientation.

40. The sharpener as in claim 39, further including a notification device for providing user notification that all the cutting links on the saw chain have been sharpened.

41. The sharpener as in claim 40, further including an incrementing device for incrementing said saw chain after each successive link is sharpened.

42. A sharpener for sharpening the chain of a chain saw, where the chain is entrained in an endless loop around a longitudinally-extending saw bar connected to the chain saw and includes a plurality of cutting links with left-facing and right-facing cutting surfaces, said sharpener including:
   a stabilizing device which can receive the saw bar and stabilize the saw bar such that the respective links on the saw chain are supported at selected locations;
   a mechanical incrementing device for advancing the saw chain around the saw bar; and
   sharpening means for sharpening the respective links on the chain, said sharpening means sharpening the links according to the respective orientations of the links around the chain, wherein said sharpening means continues to sharpen the links on the saw chain until all the links on the saw chain have been sharpened and wherein the sharpening means is laterally and vertically moveable from side-to-side and toward and away from the saw chain such that the sharpening means can be properly oriented with respect to the cutting surface of the respective cutting link, and can be brought into and out of contact with respect to the cutting surface of the respective cutting link.

43. A sharpener for sharpening the chain of a chain saw, where the chain is entrained in an endless loop around a longitudinally-extending saw bar connected to the chain saw and includes a plurality of cutting links with left-facing and right-facing cutting surfaces, said sharpener including:
   a stabilizing device which can receive the saw bar and stabilize the saw bar such that the respective links on the saw chain are supported at selected locations:
   a mechanical incrementing device for advancing the saw chain around the saw bar; and
   sharpening means for sharpening the respective links on the chain, said sharpening means sharpening the links according to the respective orientations of the links around the chain, wherein said sharpening means continues to sharpen the links on the saw chain until all the links on the saw chain have been sharpened, and further including a timing means for activating the sharpening means until all the cutting links on the saw chain have been sharpened, said timing means being in communication with the sharpening means to deactivate the sharpening means after all the cutting links have been sharpened.

44. A sharpener for sharpening the chain of a chain saw, where the chain is entrained in an endless loop around a longitudinally-extending saw bar connected to the chain saw and includes a plurality of cutting links with left-facing and right-facing cutting surfaces, said sharpener including:
   a stabilizing device which can receive the saw bar and stabilize the saw bar such that the respective links on the saw chain are supported at selected locations;
   a mechanical incrementing device for advancing the saw chain around the saw bar; and
   sharpening means for sharpening the respective links on the chain, said sharpening means sharpening the links according to the respective orientations of the links around the chain, wherein said sharpening means continues to sharpen the links on the saw chain until all the links on the saw chain have been sharpened, and further including a notification device for providing user notification that all the cutting links on the saw chain have been sharpened.

45. A sharpener for sharpening the chain of a chain saw, where the chain is entrained in an endless loop around a longitudinally-extending saw bar connected to the chain saw and includes a plurality of cutting links with left-facing and right-facing cutting surfaces, said sharpener including:

a stabilizing device which can receive the saw bar and stabilize the saw bar such that the respective links on the saw chain are supported at selected locations;

a mechanical incrementing device for advancing the saw chain around the saw bar; and sharpening means for sharpening the respective links on the chain, said sharpening means sharpening the links according to the respective orientations of the links around the chain, wherein said sharpening means continues to sharpen the links on the saw chain until all the links on the saw chain have been sharpened, and further including a sensor device for determining the presence and orientation of the cutting links around the saw bar, said sensor device being in communication with the sharpening means such that the sharpening means sharpens the cutting links appropriately depending upon the relative orientation of the cutting links.

* * * * *